United States Patent
Yun et al.

(10) Patent No.: US 8,340,827 B2
(45) Date of Patent: Dec. 25, 2012

(54) METHODS FOR CONTROLLING TIME SCALE OF GAS DELIVERY INTO A PROCESSING CHAMBER

(75) Inventors: Gunsu Yun, Fremont, CA (US); Iqbal A. Shareef, Fremont, CA (US); Kurt Jorgensen, San Carlos, CA (US); Robert Charatan, Dresdan (DE)

(73) Assignee: Lam Research Corporation, Fremont, CA (US)

( * ) Notice: Subject to any disclaimer, the term of this patent is extended or adjusted under 35 U.S.C. 154(b) by 513 days.

(21) Appl. No.: 12/477,196

(22) Filed: Jun. 3, 2009

(65) Prior Publication Data
US 2009/0319071 A1 Dec. 24, 2009

Related U.S. Application Data

(60) Provisional application No. 61/074,539, filed on Jun. 20, 2008.

(51) Int. Cl.
| | |
|---|---|
| G05D 7/00 | (2006.01) |
| G05D 11/00 | (2006.01) |
| G05D 9/00 | (2006.01) |
| G06F 19/00 | (2011.01) |
| G01F 1/12 | (2006.01) |
| F16K 31/36 | (2006.01) |
| B67D 7/00 | (2010.01) |

(52) U.S. Cl. ........ 700/282; 700/285; 700/103; 700/121; 702/100; 137/487.5; 239/71; 422/110; 422/105; 438/935

(58) Field of Classification Search .......... 700/282, 700/285, 103, 121; 702/100; 137/487.5; 239/71; 422/110, 105; 438/935
See application file for complete search history.

(56) References Cited

U.S. PATENT DOCUMENTS

| | | | |
|---|---|---|---|
| 6,450,200 B1* | 9/2002 | Ollivier ................... | 137/624.12 |
| 2001/0029888 A1* | 10/2001 | Sundarrajan et al. ......... | 118/715 |
| 2003/0211015 A1 | 11/2003 | Yen et al. | |
| 2004/0031564 A1* | 2/2004 | Gottscho et al. ......... | 156/345.24 |
| 2004/0154664 A1 | 8/2004 | Ohmi et al. | |
| 2005/0288825 A1 | 12/2005 | Tinsley et al. | |
| 2006/0130649 A1* | 6/2006 | Jain et al. ........................ | 95/82 |
| 2007/0009649 A1* | 1/2007 | Nakamura et al. .............. | 427/8 |
| 2007/0021935 A1* | 1/2007 | Larson et al. ................ | 702/100 |
| 2007/0089741 A1* | 4/2007 | Bohm et al. ............. | 128/203.12 |

(Continued)

OTHER PUBLICATIONS

"International Search Report", Issued in PCT Application No. PCT/US2009/047279; Mailing Date: Feb. 3, 2010.

(Continued)

*Primary Examiner* — Jeffrey A Gaffin
*Assistant Examiner* — Jason Lin
(74) *Attorney, Agent, or Firm* — IPSG, P.C. Intellectual Property Law

(57) ABSTRACT

A method for establishing a mass flow controller (MFC) control scheme, which is configured for reducing a time scale for gas delivery into a processing chamber, for a recipe is provided. The method includes identifying a set of delayed gas species utilized during execution of the recipe with a set of delivery time slower than a target delivery time scale. The method also includes establishing an initial overshoot strength and an initial overshoot duration for each gas specie of the set of delayed gas species. The method further includes establishing MFC control scheme by adjusting an MFC hardware for each gas specie during the execution of the recipe. Adjusting the MFC hardware includes applying the initial overshoot strength for the initial overshoot duration to determine if the MFC control scheme provides for each gas specie a pressure profile within a target accuracy of an equilibrium pressure for the processing chamber.

15 Claims, 5 Drawing Sheets

U.S. PATENT DOCUMENTS

| | | | |
|---|---|---|---|
| 2007/0181255 A1* | 8/2007 | Hayasaka et al. | 156/345.33 |
| 2008/0153311 A1* | 6/2008 | Padhi et al. | 438/780 |
| 2008/0200002 A1* | 8/2008 | Suzuki et al. | 438/381 |
| 2009/0060702 A1* | 3/2009 | Kobayashi et al. | 414/805 |
| 2009/0084987 A1* | 4/2009 | Godet et al. | 250/492.3 |
| 2009/0087964 A1* | 4/2009 | Maeda et al. | 438/482 |
| 2010/0154995 A1* | 6/2010 | Kudo et al. | 156/345.26 |

OTHER PUBLICATIONS

"Written Opinion", Issued in PCT Application No. PCT/US2009/047279; Mailing Date: Feb. 3, 2010.

"International Preliminary Report on Patentability", Issued in PCT Application No. PCT/US2009/047279; Mailing Date: Jan. 6, 2011.

* cited by examiner

METHODS FOR CONTROLLING TIME SCALE OF GAS DELIVERY INTO A PROCESSING CHAMBER

PRIORITY CLAIM

This application is related to and claims priority under 35 U.S.C. §119(e) to a commonly assigned provisional patent application entitled "Methods For Controlling Time Scale Of Gas Delivery Into A Processing Chamber," by Yun et al., Application Ser. No. 61/074,539, filed on Jun. 20, 2008, which is incorporated by reference herein.

BACKGROUND OF THE INVENTION

Advances in plasma processing have facilitated growth in the semiconductor industry. In the competitive semiconductor industry, a manufacturer may gain a competitive edge if the manufacturer has the ability to maximize throughput and/or to produce quality devices. One method for controlling throughput is to control the flow of gas into the processing chamber.

Typically, for substrate processing, a recipe may require more than one gas species. Ideally, the gas species become mixed and reach an equilibrium pressure state (e.g., set pressure) within a processing chamber at the same time. However, several factors may cause the gas species to have different time scales (i.e., delivery time).

One factor that may impact the gas delivery time is the mass of gas species. Those skilled in the art are aware that gas species with heavier molecular mass may travel slower than gas species with lighter molecular mass. The mass difference between gas species may impact the flow rate of each gas specie in a low pressure environment. In a low pressure environment, the gas flow may become molecular and each gas specie may become virtually independent of each other. As a result, separation of the gas species may occur resulting in gas composition drift at the chamber. In other words, the gas species may reach the equilibrium state at different time. Thus, the time scale (e.g., delivery time) for each gas may differ.

Another factor that may impact the gas delivery time scale is the gas line geometry. As aforementioned, a recipe may require more than one gas species to perform substrate processing. Each gas may flow from a gas line into a mixing manifold (main gas line). The geometry of each gas line may impact the flow of the gas. As an example, the delivery time will be greater for the gas flowing through the longer gas line.

Some recipes may have low-flow gas mixing with high-flow gas. This type of gas delivery is known as a carrier gas-driven delivery, where the high-flow gas (carrier gas) drives the flow of the low-flow gas (process gas) via molecular collision. In order for the process gas to enter the mixing manifold where the carrier gas is flowing, the process gas needs to build up a pressure comparable to the pressure at the mixing manifold. However, if the carrier gas is flowing at a much higher flow rate than the process gas, it could take a prohibitively long time for the process gas to build up enough pressure and then mix with the carrier gas. In this case, the carrier gas will reach the processing chamber without carrying the process gas. Thus, the carrier will reach an equilibrium state before the process gas resulting in gas composition drift.

As can be appreciated from the foregoing, undesirable consequences may result due to the gas composition drift. For most recipes, substrate processing may begin when pressure stabilization has been reached within the processing chamber, regardless of gas composition drift. Performing substrate processing without the proper gas mixture may cause substandard devices to be created. Other recipes may require each gas specie within the processing chamber to reach the required equilibrium state before processing may begin. However, the additional time required may result in longer processing time and less substrate to be processed.

BRIEF SUMMARY OF THE INVENTION

The invention relates, in an embodiment, to a method for establishing a mass flow controller (MFC) control scheme for a recipe, wherein the MFC control scheme is configured for reducing a time scale for gas delivery into a processing chamber of a plasma processing system. The method includes identifying a set of delayed gas species utilized during execution of the recipe with a set of delivery time slower than a target delivery time scale. The method also includes establishing an initial overshoot strength for each gas specie of the set of delayed gas species, wherein the initial overshoot strength is a factor by which an MFC flow rate is increased. The method further includes determining an initial overshoot duration for each gas specie of the set of delayed gas species. The initial overshoot duration is a time duration for applying the initial overshoot strength to the MFC flow rate. The method yet also includes verifying the MFC control scheme by executing the recipe by adjusting an MFC hardware for each gas specie of the set of delayed gas species, wherein adjusting the MFC hardware includes applying the initial overshoot strength for the initial overshoot duration to determine if the MFC control scheme provides for each gas specie of the set of delayed gas species a pressure profile within a target accuracy of an equilibrium pressure for the processing chamber.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1A:
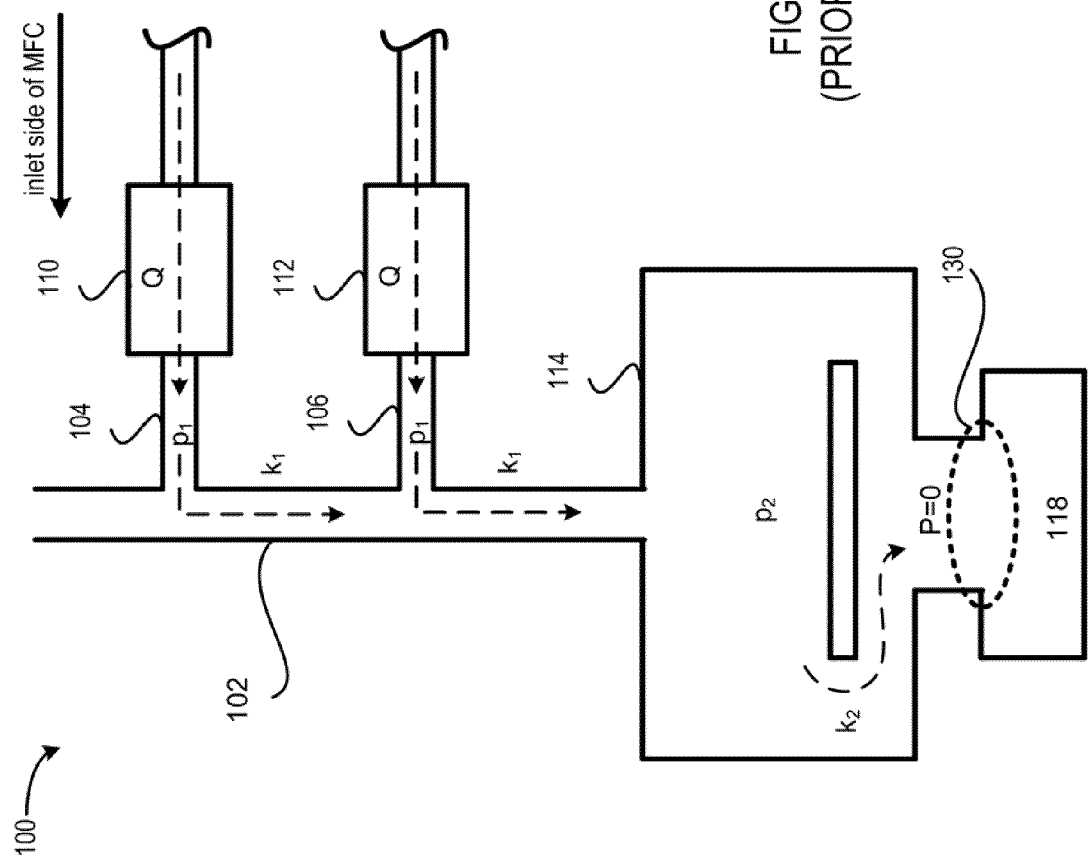
FIG. 1A shows a simple diagram of a partial view of a gas delivery system.

As aforementioned, in the prior art, delivery delay may occur when one or more gas species flows into a processing chamber after the processing chamber has reached an equilibrium pressure state (i.e., set pressure point). Since different gas species may reach the chamber at different time, gas composition drift may occur. To facilitate discussion, FIG. 1A shows a simple diagram of a partial view of a gas delivery system.

Processing tool 100 may include a gas delivery system that delivers gas into a processing chamber 114. The gas delivery system may include a main gas line 102 (i.e., mixing manifold) and one or more gas lines (104 and 106). The flow of gas through each gas line may be controlled by a mass flow controller (MFC), such as MFC 110 and MFC 112.

Typically, the gas flow into processing chamber 114 is driven by a pressure differential from the high pressure gas mixture and the low pressure processing chamber 114. The pressure of processing chamber 114 is monitored by a sensor. Based on the reading of the sensor, a vacuum pump 118 may adjust a throttle valve 130, which is positioned at the vacuum pump inlet. By adjusting throttle valve 130, vacuum pump 118 may control the pressure within processing chamber 114. The position of throttle valve 130 controls the gas conductance (volumetric gas flow rate) from processing chamber 114 to vacuum pump 118, thereby maintaining the pressure within processing chamber 114 to be at a specified equilibrium pressure. Equation 1 below shows that at an equilibrium state, the partial pressure ($p_2$) of a given gas species at the chamber reaches the equilibrium pressure ($p_e$), which is equal to the ratio of the gas flow controlled by the MFC (Q) and the conductance of the chamber to the pump ($k_2$).

$$p_2 = \frac{Q}{k_2} \equiv P_e \quad \text{(Equation 1)}$$

In practice, to set the initial valve position for throttle valve 130, a gas conductance curve may be empirically determined for each gas at a given flow rate and pressure. Once the pressure within processing chamber 114 has reached a set pressure point, substrate processing may be initiated.

$$p_2(t) = \left(1 - \frac{\tau_1 \text{Exp}[-t/\tau_1] - \tau_2 \text{Exp}[-\tau/\tau_2]}{\tau_1 - \tau_2}\right) Q/k_2 \quad \text{(Equation 2)}$$

However, even if the chamber pressure becomes stabilized, the processing environment may not be ideal for substrate processing. Ideally, the different gas species would be mixed together before arriving at processing chamber 114. However, the gas mixture delivered to processing chamber 114 may not have the correct ratio of the required gas species. In other words, gas composition may drift in processing chamber 114. Equation 2 above shows that the partial pressure ($p_2$) at a specific time (t) depends upon the gas flow time scale through the gas line ($\tau_1$), the gas flow time scale from the processing chamber to the pump ($\tau_2$), the MFC gas flow rate (Q), and the conductance between the chamber and the pump ($k_2$).

In a typical processing environment, the time scale ($\tau_2$) and the flow conductance ($k_2$) are usually unchanged since both of them are a function of the processing chamber geometry and the pumping speed. Thus, the partial pressure ($p_2$) at time t depends primarily on the time scale of the gas line ($\tau_1$) and the MFC flow rate (Q) of the given gas.

$$\tau_1 \approx 10^{-4} L^2 / D x \sqrt{M/M_{N2}} \quad \text{(Equation 3)}$$

$$\tau_1 \equiv V_1 / k_1 = \frac{\pi D^2 L/4}{10^4 D^3 / L} \approx 10^{-4} L^2 / D \quad \text{(Equation 4)}$$

(L and D in [cm] and $\tau_1$ in [sec])

The time scale of the gas line ($\tau_1$) is determined by the gas line geometry and is inversely proportional to the square root of the mass of the gas species, as shown in Equation 3. For ease of discussion, assume that the mass of the gas is not a factor. In an example, the gas flowing through gas line 104 and gas line 106 is the same. If the mass of the gas is not a factor, the time scale of the gas line ($\tau_1$) is a factor of the gas line geometry, as shown in Equation 4 above.

According to Equation 4 above, the time scale of the gas line ($\tau_1$) is a function of the gas line volume ($V_1$) and the gas line conductance ($k_1$). Since both the volume and the flow conductance of a gas line are a function of the length and/or diameter of the gas line, the time scale of the gas line ($\tau_1$) is also a function of the length and/or diameter of the gas line. In an example, assume that gas line 106 has a shorter length than gas line 104. Based on Equation 4 above, the volume of gas line 104 is greater than the volume of gas line 106 and the flow conductance of gas line 104 is less than gas line 106. Thus, the gas delivery time scale for gas line 104 is greater than the gas delivery time scale of gas line 106.

Referring back to Equation 3, besides the gas line geometry, the time scale of the gas line ($\tau_1$) is also a function of the molecular mass of the gas. In a production environment, the gas species required by a recipe may usually be of different molecular mass. The mass of a gas is especially important in a low pressure environment. In a low pressure environment, the gas flow may become molecular. In other words, the gas flow may become independent of one another (i.e., collisional momentum transfer may become minimal between the gas molecules). For a recipe that has several different gas species, the mass of the gas may determine the delivery time of the gas. Given the same physical conditions (such as each gas line having the same gas line geometry, each gas specie is flowing at the same mass flow rate, and the like) a heavier gas species flows at a slower velocity than a lighter gas species. As an example, the delivery time for $H_2$ will be about three times faster than $C_4F_8$. As a result, the lighter gas species may reach the equilibrium pressure within a processing chamber before the heavier gas specie. In other words, the gas species may separate and each gas may reach the state of equilibrium at different time.

Thus, pressure stabilization within processing chamber 114 may be reached even though the correct gas mixture has not been delivered into the processing chamber. For some recipes, substrate processing may begin even though the proper gas mixture may not be present, thereby resulting in substandard devices being created. For other recipes, substrate processing may be delayed until the proper gas mixture is present; however, the delay time may result in higher cost of production due to longer process time.

Figure 1B:
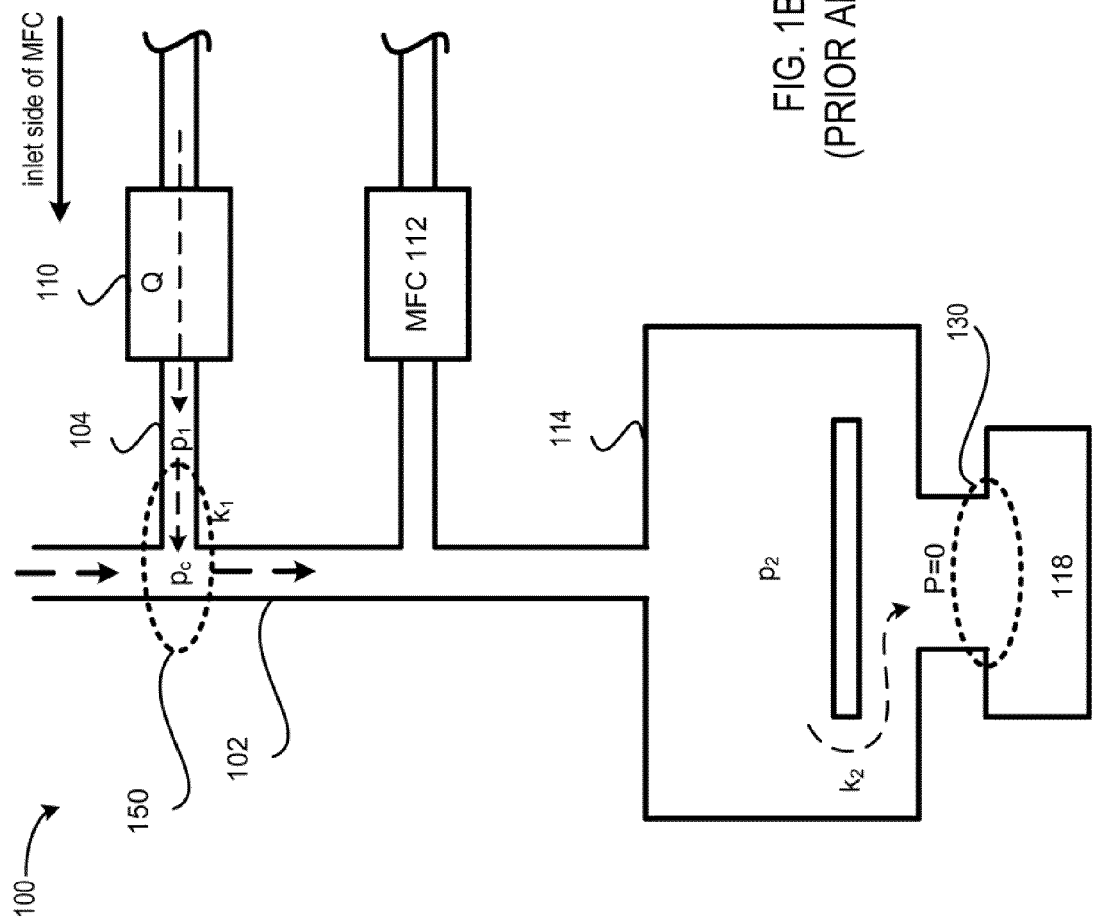
FIG. 1B shows a simple block diagram illustrating the flow of gas in a carrier gas-driven flow environment.

Even if the processing environment is not a low pressure environment, gas delivery may also be delayed if the pressure of the process gas is significantly less than the pressure of the carrier gas. FIG. 1B shows a simple block diagram illustrating the flow of gas in a carrier gas-driven flow environment. In this example, a carrier gas, such as Argon, may be injected into main gas delivery line 102 (e.g., mixing manifold) at a much higher flow rate than a process gas. In a carrier gas-driven flow environment, the process gas is usually carried into processing chamber 114 by the carrier gas via collisional momentum transfer. However, if the carrier gas pressure ($p_c$) at an intersection 150 (section at which the gas line intersects with the mixing manifold) is higher than the process gas pressure ($p_1$), the process gas may be unable to mix with the carrier gas. As a result, the process gas is "stuck" at intersection 150 until the process gas pressure ($p_1$) reaches the carrier gas pressure ($p_c$).

In other words, a sufficient pressure may have to be built up in the gas line (e.g., gas line 104) before the process gas in gas line 104 may be able to mix with the carrier gas flowing through main gas line 102. In some cases, very long delay may occur from the time the process gas is released from MFC 110 into gas line 104 before sufficient pressure builds up to enable the process gas to mix with the carrier gas. Equation 5 below shows the time scale required for pressure build-up at intersection 150. As shown in FIG. 5, the delay time is longer for larger gas line volume and smaller flow rate (Q).

$$t_c = p_c V_1/Q \quad \text{(Equation 5)}$$

As discussed in FIGS. 1A and 1B, delay of the process gas into the low pressure chamber environment may cause stabilization of the process gas flow to be reached after the set pressure point. In other words, the gas delivery time scale for certain gas species may cause gas composition drift. To minimize delay and/or to control equilibrium pressure within the processing chamber, at least one parameter—gas line conductance, MFC flow rate, or pump speed—may have to be modified. In one aspect of the invention, the inventors herein realized that by increasing the MFC flow rate for a short burst, the gas delivery time scale may be controlled without requiring hardware changes.

In accordance with embodiments of the present invention, a mass flow control (MFC) scheme to reduce the time scale of gas delivery to a processing chamber is provided. Embodiments of the invention include overshooting the MFC to reduce the effective gas delivery time scale. Embodiments of the invention also include a multiple steps process for performing the overshooting to reduce delivery time during a carrier gas-driven flow environment.

In an embodiment of the invention, a single step overshooting method is provided for overshooting the MFC to reduce the delivery delay into a processing chamber for a gas. To minimize delivery delay, an optimal overshoot strength may be determined. The optimal overshoot strength is a factor by which the MFC flow rate may be increased by to ensure minimize gas composition drift within processing chamber. Since reducing delivery delay increases the quality of substrate processing, optimal overshoot strength is desirable. To determine the optimal overshoot strength, initial overshoot strength may be calculated. The initial overshoot strength is a function of the overshoot duration and the time scale of the delayed gas species ($\tau_1$). As discussed herein, an overshoot duration refers to the time elapsed period during which an overshoot strength may be applied to an MFC flow rate.

In an embodiment, the overshoot duration is set to the response time of an MFC (e.g., the speed at which the MFC can respond to a set of instructions). For a typical MFC, a response delay may exist when an MFC setting is changed. In other words, when an MFC setting is changed a few second may elapse before the gas flow rate is changed. In an example, assume that an MFC has response delay of 2 seconds. If a tool operator first set the MFC to 20 sccm and then immediately change the MFC setting to 10 sccm, the MFC may release gas at 20 sccm for 2 seconds before releasing the gas at 10 sccm. The delay is due to the MFC response time and not due to the deliberate intention of the tool operator. Since, the intention is to minimize the time scale of gas delivery into a processing chamber, the overshoot duration set at the MFC response time may add little or no additional time to the overall delivery time, thereby enabling the overshoot strength to be utilized as a method for controlling the lime scale of gas delivery while minimizing the time required to apply the overshoot duration.

As can be appreciated from the foregoing, the response time may be specific to an MFC. In other words, if a first MFC has a different response time than a second MFC, the initial overshoot strength for the first gas species associated with the first MFC may differ from the initial overshoot strength for the second gas species associated with the second MFC. Thus, the overshoot duration is limited by the MFC response time.

As aforementioned, the overshoot strength is also a function of the time scale of a delayed gas species ($\tau_1$). Since the time scale $\tau_1$ depends on the gas line geometry and the molecular mass of the gas, the overshoot strength may have to be increased to account for a longer gas line. Similarly, the overshoot strength may also have to be increased for a gas with heavier molecular mass.

Once the initial overshoot strength has been determined, a test run may be conducted with the MFC flow rate being increased by a factor of the initial overshoot strength. In an example, if the set MFC flow rate is 20 sccm and the initial overshoot strength is 1.5, then the MFC will be initially set to 30 sccm. During the test, the chamber pressure profile may be observed for a predetermined period of time (e.g., 10 seconds). By analyzing the chamber pressure profile, the initial overshoot strength may be adjusted to identify the optimal overshoot strength. In an embodiment, an overshoot strength may be determined by adjusting the initial overshoot strength until the overshoot strength creates a chamber pressure profile in which the chamber pressure at a pre-defined target time period (e.g., 2 seconds) is within a target accuracy rate (e.g., 1 percent of the set pressure point). Since limited time is usually provided for establishing a stabilized pressure environment, the pre-defined target time period may have to be set at a time period that is less than the time allotted for stabilizing the processing chamber pressure.

Alternatively or additionally, the overshoot duration may be adjusted if the initial overshoot strength is not within the MFC capacity. As aforementioned, the overshoot duration may be set to the response time of the MFC to minimize additional time due to overshooting. However, if the modified MFC flow rate (i.e., mass flow rate increased by a factor of the overshoot strength) is too close to the maximum flow rate of an MFC, the overshoot duration may have to be increased in order to reduce the overshoot strength. In other words, the overshoot duration may be modified if the modified mass flow rate is not less than a pre-determined percentage (such as 95 percent) of the maximum MFC flow rate. In an embodiment, the pre-determined percentage is less than 100 percent to account for potential hardware inaccuracy that may exist in the MFC. Since each MFC may have different specification, the maximum MFC flow rate may vary depending upon the MFC.

In an embodiment, factors and/or physical conditions (e.g., gas line geometry, molecular mass of a gas, momentum of a gas, and the like) that may have caused delivery delay may now be managed by overshooting the MFC flow rate for an certain time duration (overshoot duration). Thus, the time scale of a gas into processing chamber may be modified to minimize the time differences between gas species for reaching an equilibrium pressure.

In an embodiment, a multiple steps overshooting method may be applied in a carrier gas-driven flow environment. Although the single step overshooting method may be applied to decrease the delivery delay in a carrier gas-driven flow environment, the multiple steps overshooting method may provide an alternative method for reducing delivery delay.

As aforementioned, in a carrier gas-driven flow environment, a low-flow process gas may have to build up sufficient pressure before it can mix with the high-flow carrier gas. To accelerate the pressure build up, in an embodiment, an initial overshoot may be applied to the MFC flow rate of the low-flow process gas. In an embodiment, the build-up overshoot duration may be a function of the ratio of the time scale of the build-up time period and the initial overshoot strength. Since the first overshoot strength (the initial overshoot strength) is applied to minimize the build-up time period, the build-up overshoot duration is less than the build-up time period, in an embodiment. However to prevent uncontrollable pressure profile (such as spiking), the build-up overshoot duration is set to be at least the MFC response time, in an embodiment. Similar to the single step overshooting method, the initial overshoot strength may be a function of the overshoot duration and the time scale of the low-flow process gas.

After accelerating the pressure build-up for the low-flow gas, the MFC flow rate may be modified by a second overshoot strength for a period of time. In an embodiment, the second overshoot duration for the second overshoot strength may be set to the MFC response time. Similar to the single step overshooting method, the second overshoot strength may be determined empirically. In other words, the second overshoot strength may be adjusted until an optimal overshoot strength is identified.

Thus, the multiple steps overshooting method enable multiple overshoot strength to be applied to accommodate the different processing conditions that may exist due to the differences in the flow rates between gas species. Similar to the single step overshooting method, the multiple steps overshooting method enables a faster gas delivery while minimizing the time required for applying the overshoot scheme.

The features and advantages of the present invention may be better understood with reference to the figures and discussions that follow.

Figure 2:
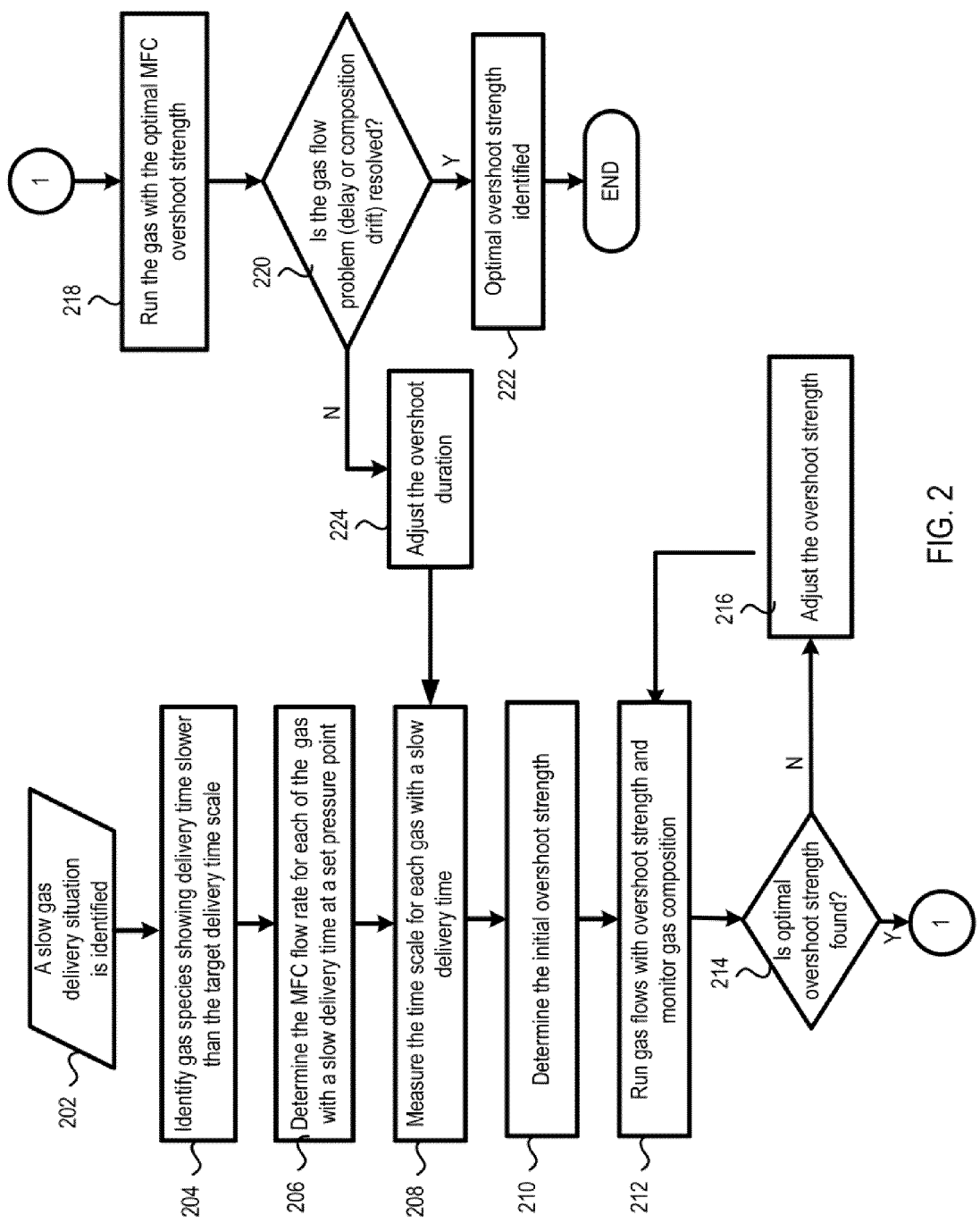
FIG. 2 shows, in an embodiment of the invention, a simple flow chart illustrating steps for implementing a pressure control scheme.

FIG. 2 shows, in an embodiment of the invention, a simple flow chart illustrating steps for implementing a pressure control scheme.

At a first step 202, a slow gas delivery situation is identified. Slow gas delivery may be due to many reasons. In an example, slow gas delivery may be due to a condition known as gas composition drift in which gas species are reaching an equilibrium state within a processing chamber at different time. As aforementioned, gas composition drift may occur in a low pressure environment and/or in a carrier gas driven-flow environment. Those skilled in the art may have different techniques for identifying when the situation occurs.

One method may include measuring a pressure time profile. By employing metrology tools positioned within the processing chamber, pressure within the processing chamber may be measured for each gas. If the time period for a gas species to reach the set pressure point takes longer than other gas species, gas composition drift may be occurring.

Gas composition drift in a carrier gas driven-flow environment may also be identified by observing the configuration of the plasma tool. Some plasma tools may have the gas line for the carrier gas positioned at the downstream of the gas line for the process gas. Since the carrier gas is located downstream, the carrier gas is unable to carry a process gas to the downstream processing chamber unless the process gas is able to reach the pressure of the carrier gas.

Gas composition drift may also occur due to the gas line configuration. A long gas line may usually add to the gas delivery time. In addition, if the gas species are of different masses, the prior art shows that a heavier gas may reach an equilibrium state within the processing chamber at a slower rate since a heavier gas tends to flow at a slower speed than a lighter gas. Additionally or alternatively, the gas line configuration may also require a large number of process gas molecules to be accumulated within the gas line volume in order for the process gas to build up enough pressure to mix properly with a carrier gas, which is usually flowing at a higher flow rate. Thus, the longer the gas line, the larger the delivery delay may be for a given gas species.

At a next step 204, the gas species with a delivery time slower than a target delivery time may be identified. Although the target delivery time is usually specific to a recipe, it is not uncommon for the target delivery time to be less than 10 seconds. In an example, a set of partial pressure profiles may be analyzed to identify the set of gas species that may have a slow delivery time.

At a next step 206, the MFC flow rate (Q) for a given gas species at a set pressure point (i.e., equilibrium pressure) may be determined. In an embodiment, the MFC flow rate may be determined by referring to a conductance curve. The conductance curve for a gas species may be determined by measuring the chamber pressure for a given flow rate. Those skilled in the art are aware that the flow rate for a given gas species at a given set pressure may already be pre-measured and may be easily retrieved. From the conductance curve and/or flow rate chart, the flow rate at a given set pressure may be determined for each gas specie that may have a slow delivery time.

At a next step 208, a time scale ($\tau_1$) for each gas specie identified as slow delivery gas is calculated. One method for determining the time scale ($\tau_1$) is by tracing the pressure rise in the processing chamber for a given MFC flow rate (Q) with a fixed throttle valve position (i.e., constant pump speed).

At a next step 210, overshoot strength ($\alpha$) may be initially set for a specific gas species at a specific MFC. In an embodiment, the initial overshoot strength ($\alpha$) may be set by employing Equation 6 below.

$$\alpha = \frac{1}{1 - \exp(-t_0/\tau_1)} \qquad \text{(Equation 6)}$$

According to Equation 6 above, the overshoot strength ($\alpha$) is a function of the overshoot duration ($t_0$) and the time scale of a delayed gas species ($\tau_1$). In an embodiment, overshoot duration ($t_0$) for a gas species may be dependent upon the MFC that controls the gas flow rate. Typically, an MFC may have a delayed response time. In an example, an MFC control may be switched to a flow rate of 40 sccm. The processing tool may experience a few seconds delay before the MFC may begin flowing gas at the new flow rate. Typically, the delay is about 0.5-2 seconds; however, the delay may vary depending upon the specific MFC. Thus, the overshoot duration ($t_o$) may change depending upon the MFC specification.

In another embodiment, the overshoot duration ($t_o$) may vary depending upon the time scale of the delayed gas species ($\tau_1$). As aforementioned, the time scale of a gas species ($\tau_1$) may depend upon the gas line geometry and the mass of the gas species. In a carrier gas driven-flow environment, the time scale of a gas species ($\tau_1$) may also depend on the flow rate of the carrier gas. Since the carrier gas is usually flowing at a higher rate than the process gas, the process gas may have to build up sufficient pressure before being able to successfully mix with the carrier gas. The additional time delay is thereby a function of the time required by the process gas to build up sufficient pressure as previously discussed in Equation 5 above.

At a next step 212, a test run may be performed by modifying the MFC flow rate (Q) by the initial overshoot strength ($\alpha$). While the test run is being performed, the gas composition within the processing chamber may be measured.

At a next step 214, a determination is made on whether or not the overshoot strength ($\alpha$) is sufficient. In an embodiment, the determination may be made by tracing the pressure profile of the gas within the processing chamber for a pre-determined period of time (e.g., 10 seconds).

If the pressure as shown in the pressure profile at a pre-defined target time period is within a target accuracy of the equilibrium pressure, the overshoot strength ($\alpha$) may be sufficient or optimal for minimizing delivery delay for the gas. Since limited time is usually provided for establishing a stabilized pressure environment, the pre-defined target time period may have to be set less than the time allotted for stabilizing the processing chamber pressure.

Figure 3:
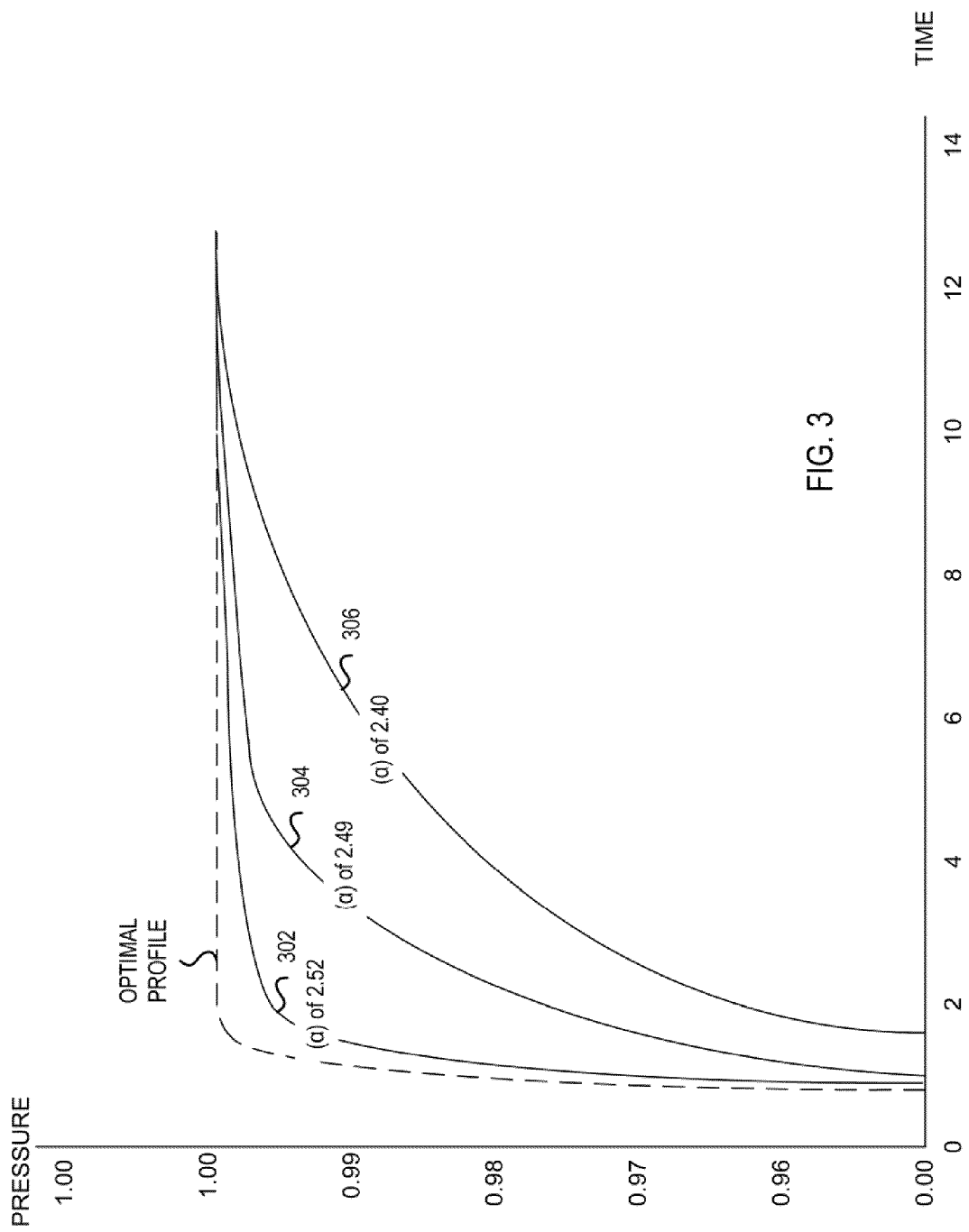
FIG. 3 shows, in an embodiment of the invention, a simple plot illustrating several overshoot strengths.

FIG. 3 shows, in an embodiment of the invention, a simple plot illustrating several overshoot strengths ($\alpha$). Consider the situation wherein, for example, the equilibrium pressure is set at 1.00. In an embodiment, the overshoot strength ($\alpha$) is considered to be optimal if the chamber pressure is within the target accuracy (i.e., 1 percent) at a pre-defined target time period. In this example, assume that the overshoot duration is 1 second and that the pre-defined target time period is twice of the overshoot duration (i.e., 2 seconds). As can be seen from the figure, the overshoot strength ($\alpha$) of 2.52 (curve 302) is considered as optimal since the pressure reaches the set pressure (1.00) within the target accuracy at the target time (2 seconds). As a result, the target pressure accuracy is set such that the pressure profile for a gas is within close proximity to the set pressure point and the pressure profile of the gas reaches equilibrium before the pre-determined period of time.

If the optimal overshoot strength ($\alpha$) is not identified, such as curves 304 and 306, then at a next step 216, the overshoot strength ($\alpha$) may be adjusted, as shown in Equation 7 below, for the target equilibrium pressure ($p_c$) and the pressure (p) at time $t_0$ attained by the overshoot strength ($\alpha$). Steps 212-216 are iterative and may be repeated until an optimal overshoot strength is determined.

$$\alpha_* = \alpha p_c / p(2t_0)$$ (Equation 7)

If the overshoot strength ($\alpha$) is found, then at a next step 218, the gas is run again with the optimal MFC overshoot strength ($\alpha*$).

Although an optimal overshoot strength may be determined, inaccuracy may occur if the optimal overshoot strength causes the MFC flow rate to be set too high. Ideally, hardware (e.g., MFC) may perform without malfunction. Those skilled in the arts are aware that most hardware may not perform according to design in the extreme range (e.g., maximum and minimum). To account for the potential error that may exist in the MFC, the desired modified MFC flow rate may be less than the maximum MFC flow rate. At a next step 220, a determination is made on whether the slow gas delivery situation has been resolved without experiencing hardware inaccuracy. One method for performing the analysis is to calculate if the modified MFC flow rate (i.e., Q×$\alpha*$) is less than a pre-determined percentage or the (e.g., 95 percent) of the maximum MFC flow rate. In an embodiment, the pre-determined percentage is set at less than 100 percent. Since the maximum MFC flow rate may vary depending upon MFC specification, the acceptable range is set as a percentage of the maximum MFC flow rate instead of as an actual constant.

If the condition is met, then the optimal overshoot strength ($\alpha*$) has been identified for the gas species for a specific recipe (step 222).

However, if the condition is not met, then at a next step 224, the overshoot duration ($t_o$) may be increased. As aforementioned, the overshoot duration may be set to the MFC response time to minimize the possibility of increasing the time for delivering a gas to the processing chamber. However, if the modified MFC flow rate is too close to the maximum flow rate of an MFC, potential for hardware inaccuracy may exist. To minimize the possibility of inaccuracy due to hardware limitations, the overshoot duration may have to be increased, in an embodiment, in order to reduce the optimal overshoot strength, thereby reducing the modified MFC flow rate.

Steps 208-224 may be iterative until an optimal overshoot strength has been determined.

As can be appreciated from FIG. 2, the optimal overshoot strength ($\alpha*$) may be determined for a specific gas. By identifying the optimal overshoot strength ($\alpha*$), the delivery delay may be significantly reduced. Thus, the optimal overshoot strength ($\alpha*$) may be employed to minimize gas composition drift by manipulating the MFC flow rate of one or more gas species.

Figure 4:
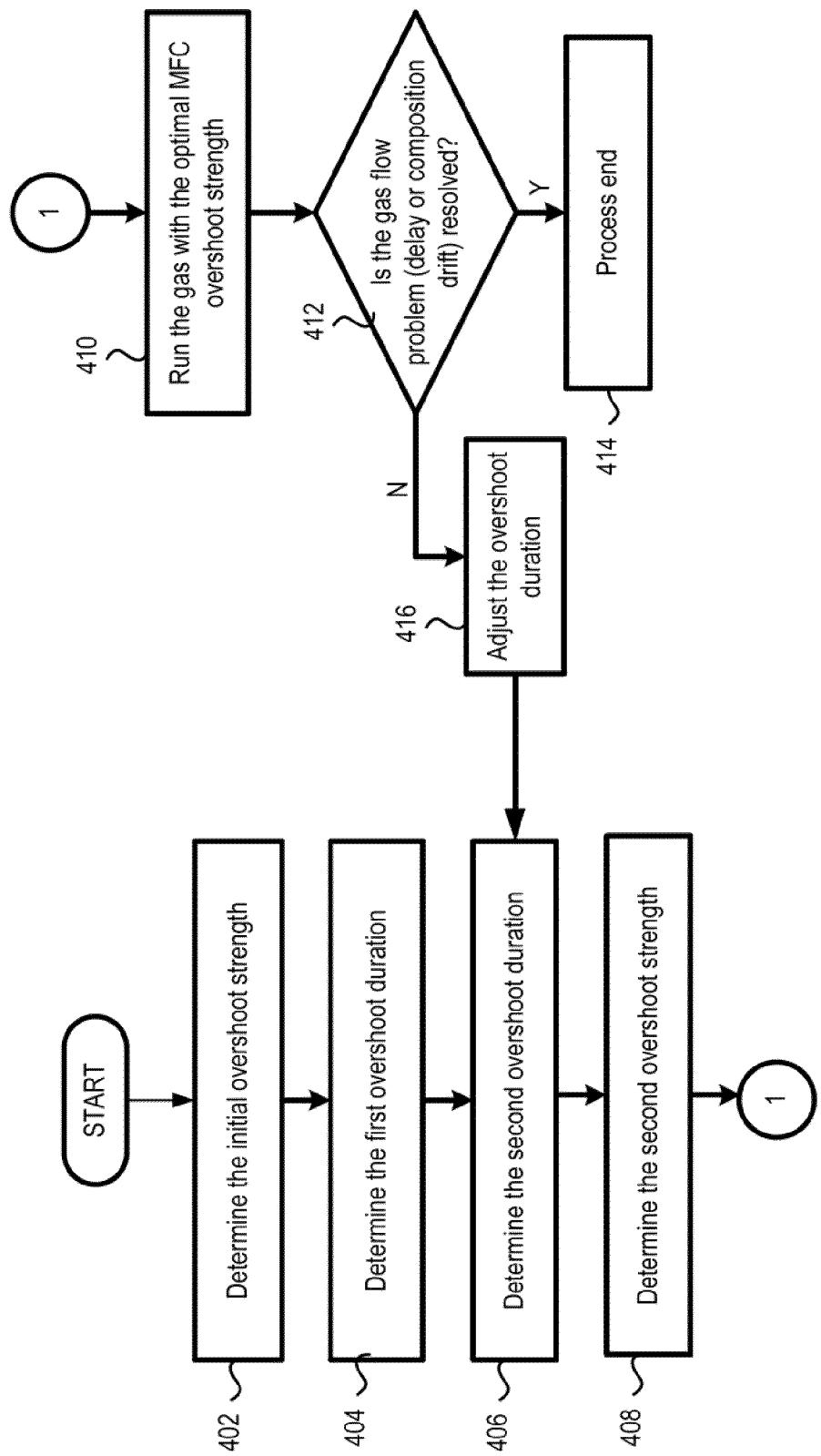
FIG. 4 shows, in an embodiment, a simple flow chart illustrating the steps for performing a multiple steps overshooting process.

For a carrier gas-driven flow, the method described in FIG. 2 may reduce the time scale associated with a gas. However, due to the additional time delay that may occur due to the time scale associated with the built-up pressure ($t_c$), the method described in FIG. 2 may be adjusted to allow for a multiple steps overshooting process that may further reduce the delivery delay. FIG. 4 shows, in an embodiment, a simple flow chart illustrating the steps for performing a multiple steps overshooting process. Consider the situation wherein, for example, a gas with a slow delivery time is identified in a carrier gas-driven flow environment.

At a first step 402, the initial overshoot strength ($\alpha$) is determined. As aforementioned, in a carrier gas-driven flow environment, besides the delivery delay caused by the gas line geometry and/or molecular mass of a gas, the delivery delay for a low-flow process gas may also depend on the time scale required for the low-flow gas to build up sufficient pressure to mix with the high-flow carrier gas. To address this type of delivery, in an embodiment, the first overshoot strength may be set to the maximum MFC flow rate.

At next step 404, the first overshoot duration is calculated. In an embodiment, the first overshoot duration (i.e., build-up overshoot duration) may be a function of the ratio of the pressure build-up time period and the initial overshoot strength. In an embodiment, the build-up overshoot duration is less than the build-up time period since the initial overshoot strength is applied to minimize the build-up lime period. The overshoot duration for the first overshooting step may be calculated using Equation 8 below. To minimize uncontrolled pressure profile (such as spiking) the first overshoot duration ($t_{x\alpha}$) may be set at a value at greater than or equal to the MFC response time ($t_0$), in an embodiment.

$$t_{c\alpha} \equiv \frac{t_c}{\alpha} = \frac{p_c V_1}{\alpha Q} \qquad \text{(Equation 8)}$$

After accelerating the pressure build-up for the low-flow process gas, the MFC flow rate may be modified to manage the time scale related to the gas line geometry and/or the molecular mass of the gas. At next step 406, a second overshoot duration may be determined similar to the single step overshooting. Since the second overshoot duration is the time required to manage the time associated with the gas line geometry and/or the molecular mass of a gas, the second overshoot duration may be set to the MFC response time (same as the overshoot duration of FIG. 2), in an embodiment, to minimize additional time being added to the overall pressure stabilization time.

After the second overshoot duration has been determined, at next step 408, the second overshoot strength is determined. In an embodiment, the second overshoot strength may be determined by performing a test run. In an embodiment, the test run may include increasing the MFC flow rate (Q) by the initial overshoot strength (i.e., first overshoot strength). Similar to the single step overshooting method, the second overshoot strength may be determined empirically. In an example, the second overshoot strength may be adjusted until an optimal overshoot strength ($\alpha\bullet$) is identified (such that the chamber pressure at a pre-defined target time period is within the target accuracy of the equilibrium pressure). Step 406 is similar to step 212-216 of FIG. 2.

Once the second overshoot strength has been determined, then at a next step 410, another test run may be performed. The test run, in an embodiment, may include the multiple overshoot strength and overshoot duration.

At next step 412, a determination is made on whether the slow gas delivery situation has been resolved. Similar to FIG. 2, the determination may be made by determining whether or not the modified MFC flow rate for the first overshoot duration and the second overshoot duration is within the pre-determined percentage of the maximum MFC flow rate.

If the condition is met, then the optimal shoot strength ($\alpha\bullet$) has been identified for the gas species for a specific recipe (step 414) and the process may end.

However, if the condition is not met, then at next step 416, the second overshoot duration may be changed.

Steps 406-416 may be iterative until the optimal MFC scheme has been determined.

Thus, the multiple steps overshooting method enable multiple overshoot strength to be applied to accommodate the different time scales that may affect the overall delivery time for a gas. Similar to the single step overshooting method, the multiple steps overshooting method provide a method for determining a modified MFC flow rate that reduces delivery delay while minimizing the time required for applying the overshoot strength. Both the methods described in FIGS. 2 and 4 may be manually performed by a technician. In an embodiment, the MFC scheme, as illustrated by FIGS. 2 and 4 may also be automatically applied (e.g., software application), thereby reducing labor cost and minimizing the risk of human error.

As can be appreciated from one or more embodiments of the present invention, methods are provided for managing the time scale of a gas specie. By determining the optimal overshoot strength, MFC flow rate may be adjusted to significantly reduce gas composition drift. With a modified MFC flow rate, better control of gas throughput is provided, thereby enabling less substandard substrates to be manufactured. Thus, the overshooting methods provide an inexpensive solution for manufacturing higher quality substrate with little or no increase in overall processing time.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention, it is therefore intended that the following appended claims be interpreted as including all such alterations, permutations, and equivalents as fall within the true spirit and scope of the present invention.

What is claimed is:

1. A method for ascertaining a mass flow controller (MFC) control scheme for a recipe, said MFC control scheme being configured for reducing a time scale for gas delivery into a processing chamber of a plasma processing system, comprising:

identifying a set of delayed gas species utilized during execution of said recipe with a set of delivery time slower than a target delivery time scale;

establishing an initial overshoot strength for each gas specie of said set of delayed gas species, wherein said initial overshoot strength being a factor by which an MFC flow rate is increased;

determining an initial overshoot duration for said each gas specie of said set of delayed as species, said initial overshoot duration being a time duration for applying said initial overshoot strength to said MFC flow rate;

establishing said MFC control scheme by executing said recipe by adjusting an MFC hardware for said each gas specie of said set of delayed gas species, wherein said adjusting said MFC hardware includes applying said initial overshoot strength for said initial overshoot duration to determine if said MFC control scheme provides for said each gas specie of said set of delayed gas species a pressure profile within a target accuracy of an equilibrium pressure for said processing chamber; and adjusting said initial overshoot strength if said pressure profile for said each has specie of said set of delayed gas species is not within said target accuracy of said equilibrium pressure for said processing chamber, wherein said initial overshoot duration for said each gas specie of said set of delayed gas species is modified if an adjusted MFC flow rate is greater than a pre-determined percentage of a maximum MFC flow rate for said MFC hardware wherein said adjusted MFC flow rate is said MFC flow rate modified by said initial overshoot strength for said initial overshoot duration.

2. The method of claim 1 further including identifying said MFC flow rate for said each gas specie of said set of delayed gas species; and determining a time scale for said each gas specie of said set of delayed gas species, wherein said time scale is a function of at least one of a gas line geometry, mass of said each gas specie, and said MFC flow rate of said each gas specie.

3. The method of claim 1 wherein said initial overshoot duration is a factor of at least one of a delayed response time for said MFC hardware, and a time scale of said each gas specie of said set of delayed gas species, wherein said time scale is a function of at least one of a gas line geometry, mass of said each gas specie, and said MFC now rate of said each gas specie.

4. The method of claim 1 wherein said initial overshoot strength is a function of said initial overshoot duration and a time scale of said each gas specie of said set of delayed gas species, wherein said time scale is a function of at least one of a gas line geometry, mass of said each gas specie, and said MFC flow rate of said each gas specie.

5. The method of claim 1 wherein an optimal overshoot strength for said each gas specie of said set of delayed was species is determined when said initial overshoot strength is within said target accuracy of said equilibrium pressure and said adjusted MFC flow rate is less than said pre-determined percentage of said maximum MFC flow rate for said MFC hardware.

6. A method for establishing a mass flow controller (MFC) control scheme for as recipe, said MFC control scheme being configured for reducing a time scale for gas delivery into a processing chamber of a plasma processing system, comprising:

identifying a set of delayed gas species utilized during execution of said recipe with a set of delivery time slower than to target delivery time scale;

establishing an initial overshoot strength for each gas specie of said set of delayed gas species, wherein said initial overshoot strength being a first factor by which an MFC flow rate is increased during an initial overshoot duration, said initial overshoot duration being, a first time duration for applying said initial overshoot strength to said MFC flow rate;

establishing a second overshoot strength for said each gas specie of said set of delayed gas species, wherein said second overshoot strength being a second factor by which said MFC flow rate is increased during a second overshoot duration, said second overshoot duration being a second time duration for applying said second overshoot strength to said MFC flow rate, and establishing said MFC control scheme by executing said recipe by adjusting an MFC hardware for said each as specie of said set of delayed gas species, wherein said adjusting said MFC hardware includes applying said initial overshoot strength and said second overshoot strength to determine if said MFC control scheme provides for said each gas specie of said set of delayed gas species a pressure profile within a target accuracy of an equilibrium pressure for said processing chamber.

7. The method of claim 6 further including identifying said MFC flow rate for said each gas specie of said set of delayed gas species; and determining a time scale for said each gas specie of said set of delayed gas species, wherein said time scale is a function of at least one of a gas line geometry, mass of said each gas specie, and said MFC flow rate of said each gas specie.

8. The method of claim 7 wherein said initial overshoot strength for said each gas specie is set to a maximum MFC flow rate for said MFC hardware.

9. The method of claim 8 wherein said initial overshoot duration for said each gas specie is a factor of said initial overshoot strength and a pressure build-up time period, wherein said pressure buildup time period being a time duration during which pressure for said each gas specie is being accumulated to at least match pressure for as carrier gas, said carrier gas flowing at a higher flow rate than said each gas specie.

10. The method of claim 9 wherein said second overshoot duration is a factor of a delayed response time for said MFC hardware.

11. The method of claim 10 wherein said second overshoot strength is initially set to said initial overshoot strength, wherein said second overshoot strength is adjusted by applying empirical data gathered, wherein said second overshoot strength is adjusted if said pressure profile for said each gas specie of said set of delayed gas species is not within said target accuracy of said equilibrium pressure for said processing chamber.

12. The method of claim 11 wherein said second overshoot duration for said each gas specie of said set of delayed gas species is modified if an adjusted MFC flow rate based on said second overshoot strength and said second overshoot duration is greater than a pre-determined percentage of said maximum MFC flow rate for said MFC hardware.

13. The method of claim 12 wherein said optimal overshoot strength for said each gas specie of said set of delayed gas species is determined when said second overshoot strength is within said target accuracy of said equilibrium pressure and said adjusted MFC flow rate is less than said pre-determined percentage of said maximum MFC flow rate for said MFC hardware.

14. A method for determining an optimal overshoot strength for reducing gas delivery time scale into a processing chamber of a plasma processing system during execution of a recipe, comprising:

identifying a set of delayed gas species utilized during said execution of said recipe with a set of delivery time slower than a target delivery time scale;

establishing an initial overshoot strength for each gas specie, wherein said initial overshoot strength being a factor by which a mass flow controller (MFC) flow rate is increased;

determining an initial overshoot duration for said each gas specie, said initial overshoot duration being a time duration for applying said initial overshoot strength to said MFC flow rate for said each gas specie;

executing said recipe with an adjusted MFC flow rate for said each gas specie by applying said initial overshoot strength for said initial overshoot duration;

comparing a pressure profile for said each gas specie established during said execution of said recipe against a target accuracy of an equilibrium pressure for said processing chamber to determine if said initial overshoot strength is said optimal overshoot strength;

adjusting said initial overshoot strength if said pressure profile for said each gas specie is not within said target accuracy of said equilibrium pressure for said processing chamber; and identifying said MFC flow rate for said each gas specie of said set of delayed gas species; and determining a time scale for said each gas specie of said set of delayed gas species, wherein said time scale is a function of at least one of a gas line geometry, mass of said each gas specie, and said MFC flow rate of said each gas specie, wherein said initial overshoot strength is function of said initial overshoot duration and said time scale of said each gas specie of said set of delayed gas species and wherein said initial overshoot duration for said each gas specie of said set of delayed as species is modified if said adjusted MFC flow rate is greater than a pre-determined percentage of a maximum MFC flow rate for an MFC hardware.

15. The method of claim 14 wherein said optimal overshoot strength for said each gas specie of said set of delayed gas species is determined when said initial overshoot strength is within said target accuracy of said equilibrium pressure and said adjusted MFC flow rate is less than said pre-determined percentage of said maximum MFC flow rate for said MFC hardware.

* * * * *